US011041469B2

(12) United States Patent
Razgani et al.

(10) Patent No.: US 11,041,469 B2
(45) Date of Patent: Jun. 22, 2021

(54) DISCHARGE CONTROL DEVICE FOR A FILTER SYSTEM, AND FILTER SYSTEM HAVING A DISCHARGE CONTROL DEVICE

(71) Applicant: MANN+HUMMEL GmbH, Ludwigsburg (DE)

(72) Inventors: Idriss Razgani, Tangier (MA); Christoph Baumann, Moeglingen (DE); Dietmar Talmon-Gros, Oberstenfeld (DE); Michal Tuma, Hlinsko v Cechach (CZ); Jan Svoboda, Cíhalín (CZ)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/857,672

(22) Filed: Apr. 24, 2020

(65) Prior Publication Data

US 2020/0248662 A1    Aug. 6, 2020

Related U.S. Application Data

(63) Continuation of application No. PCT/EP2018/079374, filed on Oct. 26, 2018.

(30) Foreign Application Priority Data

Oct. 27, 2017  (DE) .......................... 102017010017.9

(51) Int. Cl.
*F02M 37/28* (2019.01)
*B01D 35/157* (2006.01)
*B01D 36/00* (2006.01)

(52) U.S. Cl.
CPC ........... *F02M 37/28* (2019.01); *B01D 35/157* (2013.01); *B01D 36/005* (2013.01); *B01D 36/006* (2013.01); *B01D 2201/16* (2013.01)

(58) Field of Classification Search
CPC .............. B01D 2201/16; B01D 35/157; B01D 36/005; B01D 2201/54; B01D 29/114;
(Continued)

(56) References Cited

U.S. PATENT DOCUMENTS 3,685,655 A   8/1972   Muller
4,799,504 A   1/1989   Scragg
(Continued)

FOREIGN PATENT DOCUMENTS

JP   S60135659 A   7/1985

*Primary Examiner* — Terry K Cecil
(74) *Attorney, Agent, or Firm* — James Hasselbeck (57) ABSTRACT

A discharge control device for a filter system and a filter system for filtering a media flow of a first and a second medium is provided with a collecting chamber that collects the second medium separated from the media flow. A sensor arrangement with a first sensor unit, a second sensor unit, a first shut-off valve having a closure body, and a second shut-off valve is provided. The first sensor unit is operatively connected to the first shut-off valve. The first sensor unit has a float that purely mechanically actuates the closure body of the first shut-off valve. The second shut-off valve is arranged in series in flow communication with the first shut-off valve. The second shut-off valve has an electromagnetically actuatable valve controlled by the second sensor unit as a function of a fill level of second medium in the collecting chamber.

15 Claims, 9 Drawing Sheets

(58) Field of Classification Search
CPC .... B01D 35/16; B01D 36/006; B01D 36/003; B01D 36/008; B01D 17/0214; F02M 37/28; F02M 37/26; F02M 37/24
See application file for complete search history.

(56) References Cited

U.S. PATENT DOCUMENTS

| | | | |
|---|---|---|---|
| 7,476,310 B2 | 1/2009 | Girondi | |
| 8,409,446 B2* | 4/2013 | Abdalla | B01D 36/006 210/744 |
| 10,406,465 B2* | 9/2019 | Sradnick | B01D 36/005 |
| 2011/0041920 A1 | 2/2011 | Abdalla | |

* cited by examiner

DISCHARGE CONTROL DEVICE FOR A FILTER SYSTEM, AND FILTER SYSTEM HAVING A DISCHARGE CONTROL DEVICE

CROSS-REFERENCE TO RELATED APPLICATIONS

This application is a continuation application of international application No. PCT/EP2018/079374 having an international filing date of 26 Oct. 2018 and designating the United States, the international application claiming a priority date of 27 Oct. 2017 based on prior filed German patent application No. 10 2017 010 017.9, the entire contents of the aforesaid international application and the aforesaid German patent application being incorporated herein by reference.

BACKGROUND OF THE INVENTION

The invention concerns a discharge control device for a filter system for filtering a media flow comprising a first and a second medium, as well as a filter system with a discharge control device, in particular in a fuel supply system, in particular a diesel fuel supply system of a motor vehicle.

It is known to separate water from diesel fuel in fuel filter systems and drain it as needed. DE 11 2010 003 359 T5 discloses an automatic drainage system in a filter system, with a float valve that is arranged inside the filter housing in a float valve chamber and has arranged downstream in flow connection a solenoid valve. The float comprises a density that is less than that of a first medium and greater than that of a second medium. In one floating position, it is possible for the first medium to pass through a float valve opening when the float valve chamber is filled with the first medium. In a sealed position, i.e., when the float valve chamber is not filled with the first medium, it is prevented that the first and the second medium pass through the float valve opening. The solenoid valve comprises a solenoid opening that is open when the solenoid valve is switched on and that is closed when the solenoid valve is switched off.

JP 60 135 659 A2 discloses a passive discharge control device for water separated from fuel which has collected in a water collecting chamber that is positioned at the bottom in the gravity direction. It comprises a first shut-off valve that releases by means of a float a water drainage channel as soon as a predefined fill level is surpassed. Downstream of the float, a pressure valve is provided that keeps the drainage channel closed relative to the environment as long as a predefined drainage pressure is not surpassed in the water collecting chamber. The drainage pressure is selectively generated in a targeted fashion by a pump. The pressure valve is therefore not controlled by a fill level criterion but by a pressure criterion.

SUMMARY OF THE INVENTION

An object of the invention is to improve a drainage control device of a filter system for filtering a media flow comprising a first and a second medium, in particular to avoid reliably and robust an undesirable escape of the first medium or a mixture of the media.

A further object of the invention is to provide a filter system with an improved drainage control device.

The aforementioned objects are solved according to one aspect of the invention for a drainage control device for a filter system, as well as, according to a further aspect of the invention, for a filter system, with a sensor arrangement with at least one first sensor unit and at least one second sensor unit and with at least one first shut-off valve that is operatively connected with at least one of the sensor units, wherein the first shut-off valve comprises a first closure body which is mechanically actuated or mechanically actuatable.

Beneficial embodiments and advantages of the invention result from the additional claims, the description, and the drawing.

A drainage control device for a filter system for filtering a media flow which comprises a mixture of a first and a second medium is proposed, with a collecting chamber that is provided for collecting the second medium separated from the media flow, comprising a sensor arrangement with at least one first sensor unit and at least one second sensor unit and a first shut-off valve with a first closure body that is operatively connected with at least one of the sensor units. The sensor unit that is operatively connected with the first shut-off valve comprises a float that serves for purely mechanical actuation of the first closure body of the first shut-off valve. Moreover, a second shut-off valve is provided that is arranged in series in flow communication with the first shut-off valve.

Purely mechanical means herein that the closure body of the first shut-off valve is actuated without non-mechanical means for force transmission and/or force deflection and/or non-mechanical transmission. The exclusively mechanical actuation can however be effected indirectly or directly, thus in particular by means of a single-stage or multi-stage intermediately positioned transmission. In particular, it can be advantageous when the sensor units that act on the shut-off valves are based on different action mechanisms. For example, in case of a fault state in which an action mechanism is disrupted, an emergency operation can be maintained and at least an undesirable escape of the first medium can be prevented.

The position of the float, in particular in the gravity direction, is changeable depending on a fill level of the second medium in the collecting chamber. By means of the purely mechanical coupling, this positional change of the float is transmitted directly or by means of a certain characteristic line to the closure body of the first shut-off valve. Advantageously, the float can open the closure body in case of a critical fill level of the second medium in the collecting chamber and keep it closed in case of a fill level of the second medium in the collecting chamber below the critical fill level. This is in particular advantageous because the first shut-off valve is coupled with a further shut-off valve. In order to drain the second medium when it has reached a critical fill level, it is now predefined as a safety criterion that both shut-off valves must be open because they are connected in series. The first shut-off valve can ensure in this context that the collecting chamber is kept closed or is closed again after a drainage process when the second shut-off valve does not close due to a failure even though no first medium is present (anymore) in the collecting chamber.

In a safety-relevant system as, for example, an automatic water discharge system, the high safety specifications (preventing discharge of hydrocarbons into the environment) are often ensured by a redundancy in the region of the sensors and the actors. Advantageously, by means of the present invention, a cost-efficient alternative can be realized because the purely mechanical action in combination with only one further, preferably electric, shut-off valve with sensor can form a redundant system.

According to the invention, the second shut-off valve comprises a valve that is actuated electromagnetically and that is controllable by the other one of the sensor units as a function of the fill level of the second medium in the collecting chamber, i.e., it is controlled by the sensor unit which does not actuate purely mechanically the first closure body of the first shut-off valve. The control of the solenoid valve of the second shut-off valve can be realized either directly (=direct electric coupling) or indirectly. For this purpose, the valve that is actuated electromagnetically can be coupled expediently with an electronic control, for example, a vehicle control in case of the use in a motor vehicle.

According to a preferred embodiment, it can be provided that the second shut-off valve is arranged downstream of the first shut-off valve. When the second shut-off valve does not close due to a fault state, even though no second medium is present in the collecting chamber anymore, the collecting chamber is closed or remains closed by the first shut-off valve because the closure body can return purely mechanically into the sealing seat. Due to this purely mechanical implementation of a redundancy, an extremely robust and also cost-efficient system is provided.

The first sensor unit is coupled with at least one shut-off valve in order to drain the second medium automatically from a media outlet of the collecting chamber upon reaching a drainage criterion.

Advantageously, with the discharge control device a safe and reliable operation of the filter system can be achieved even for long service lives. It can be achieved that practically the pure second medium, in particular at least 90% (volume percent) and no mixture of first and second medium is discharged from the collecting chamber. The first medium in a preferred embodiment can be a fuel, in particular diesel; the second medium can be water.

Because at least two sensor units are provided which detect the presence of the second medium in the collecting chamber, the reliability of the discharge control device can be further increased. Because the at least two sensor units are based on different action mechanisms, the presence of the second medium in the collecting chamber can be detected by each sensor unit independent of the other sensor unit.

The discharge criterion can be in particular a fill level of the second medium in the collecting chamber. Drainage of the second medium from the collecting chamber can be realized by the pressure of the first medium which is standing above the second medium or by the force of gravity acting on the second medium or by a pressure that is present in a volume arranged in flow communication downstream of the collecting chamber and generated by one or several pump(s) or a corresponding pressure differential between the collecting chamber and the volume.

Different action mechanisms are in particular different physical measuring principles, for example, the detection of an electrical resistance of a medium present in the collecting chamber, the detection of a magnetic field, the detection of radiation, and the like.

According to an advantageous embodiment, the first shut-off valve can comprise a lever device for actuating the closure body. In particular, the lever device for actuating the closure body can be embodied advantageously as a single-lever arrangement. Alternatively, the lever device for actuating the closure body can be embodied as a multi-lever arrangement.

The closing effect and/or the opening effect can be reinforced by the leverage. This has the advantage that fulfilling the function becomes more robust because the disturbing forces on the shut-off valve and on the closure body become multiple times smaller than the action forces. Advantageously, in addition to the action of the force of gravity and of the pressure of the closure body on its sealing seat, the closure body can be held in its sealing seat by the lever action. Optionally, the closure body can be pretensioned by a spring force in order to reinforce this effect. Due to the lever principle and the selection of a single-lever arrangement or two-lever arrangement or multi-lever arrangement, freedoms in regard to the design of the float and thus the adaptation of the forces responsible for the seal-tightness of the system are created.

According to an advantageous embodiment of the discharge control device with lever device, the lever device can comprise a shaft and a first lever rod that is supported on the shaft and that connects the float with the shaft. At the first lever rod, a connecting element to the closure body can be arranged that can be supported between shaft and float. The arrangement is robust and can be controlled by the fill level of the second medium.

According to an advantageous embodiment, the lever arrangement and the shut-off valves can be integrated in the collecting chamber. This provides for a compact arrangement.

According to an advantageous embodiment, the sensor which is embodied as a float, the lever arrangement, and the mechanically actuatable shut-off valve can be designed as an assembly that is mountable in the collecting chamber. Advantageously, retrofitting of filter systems with such a discharge control device is possible. Advantageously, the assembly can be combined with other types of shut-off valves so that a reliable redundancy of a discharge control device can be achieved.

According to an advantageous embodiment, each sensor unit can have correlated therewith a separate shut-off valve. In this way, each shut-off valve can be controlled independent of the other one. It can be ensured that practically only the second medium is drained.

According to an advantageous embodiment, the second sensor unit can be provided for direct control of the second shut-off valve. The direct control enables switching of the shut-off valve by means of a sensor signal. The other one of the sensor units can send its sensor signal to a control device which is coupled with this sensor unit, for example, a vehicle control unit, which is provided for controlling the other one of the shut-off valves and then correspondingly controls the shut-off valve correlated with this sensor unit.

According to an advantageous embodiment, at least one of the sensor units can be coupled with a control unit. The sensor units can send their sensor signals to the control unit, for example, a vehicle control unit. The control unit can perform a logic operation on the sensor signals of the sensor units and in this way ensure that the shut-off valves are opened when all sensor units detect the presence of the second medium in the collecting chamber and at least one discharge criterion is fulfilled.

According to an advantageous embodiment, the sensor arrangement can comprise a sensor unit, in particular the second sensor unit, that comprises a magnetic field sensor that detects a magnetic field which can penetrate the medium contained in the collecting chamber, wherein preferably the magnetic field sensor comprises a reed switch. In particular, the reed switch can advantageously interact with a magnetic float which changes its position upon presence of the second medium in the collecting chamber. The float can rise or the reed switch can be arranged in a permanent magnetic field that can be shielded by a float that rises upon presence of the second medium in the collecting chamber.

According to an advantageous embodiment, the sensor arrangement can comprise in addition or alternatively a sensor unit with a capacitive sensor and/or an optical sensor and/or a resistance sensor. A capacitive sensor is beneficial when the permeability of the two media is different. An optical sensor is beneficial when the optical transmission in the two media and/or a mixture of the media is different.

According to a further aspect of the invention, an assembly is proposed for a discharge control device according to the invention, comprising a float, a lever arrangement, and a mechanically actuatable shut-off valve. The assembly is preferably mountable in a collecting chamber. The closure body of the shut-off valve is seated in closed position in a sealing seat in the base element of the assembly and closes in this position an opening through which the medium contained in the collecting chamber can exit. In the closed position, no or only very little water is contained in the collecting chamber. The base element comprises, at the side which is oppositely positioned to the closure body, a sealing device with which the shut-off valve can engage a connecting line to a further shut-off valve. Advantageously, a shaft of the lever arrangement can be supported at the base element.

According to a further aspect of the invention, a filter system for filtering a media flow comprising a first and a second medium is proposed. The filter system comprises a filter element which is arranged in a housing and in particular exchangeable as well as a discharge control device and a collecting chamber which is provided for collecting the second medium which is separated from the media flow. The discharge control device comprises a sensor arrangement with at least one first sensor unit and at least one second sensor unit and at least one first shut-off valve that is operatively connected with at least one of the sensor units, wherein the first shut-off valve comprises a first closure body that is mechanically actuated or actuatable.

Advantageously, the reliability for an automatic discharge of the second medium from the collecting chamber can be improved. Furthermore, the safety against an accidental discharge of the first medium can be improved.

According to a beneficial configuration, the sensors of the first and the second sensor unit can be based on different action mechanisms. In this way, the safety against an accidental discharge of the first medium can be further improved even when the second sensor unit works incorrectly.

According to a beneficial configuration, the filter system can be designed as a fuel filter system and the discharge control device can be provided for discharging water separated from fuel from the collecting chamber.

Advantageously, a fuel filter system, in particular for diesel, can be created whose reliability for an automatic discharge of the water from the collecting chamber is improved.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will also consider the features expediently individually and combine them to other expedient combinations.

DESCRIPTION OF PREFERRED EMBODIMENTS

In the Figures, same or same type components are identified with identical reference characters. The Figures show only examples and are not to be understood as limiting.

Figure 1:
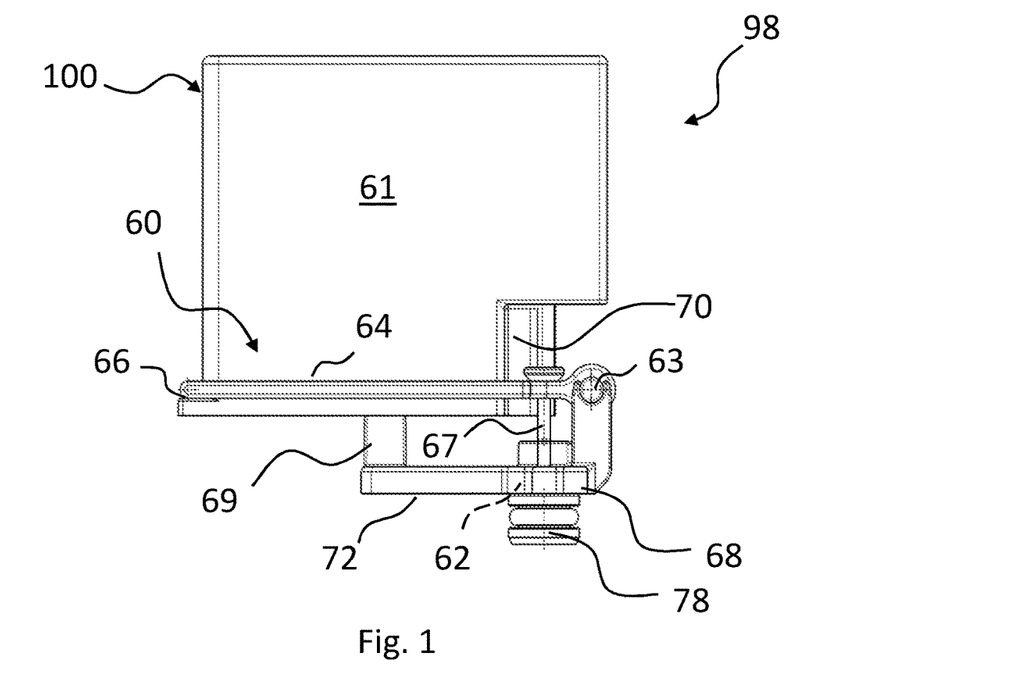
FIG. 1 shows in a side view a schematic illustration of a sensor unit of a discharge control device according to a first embodiment of the invention with a closure body in the closed position.
Figure 2:
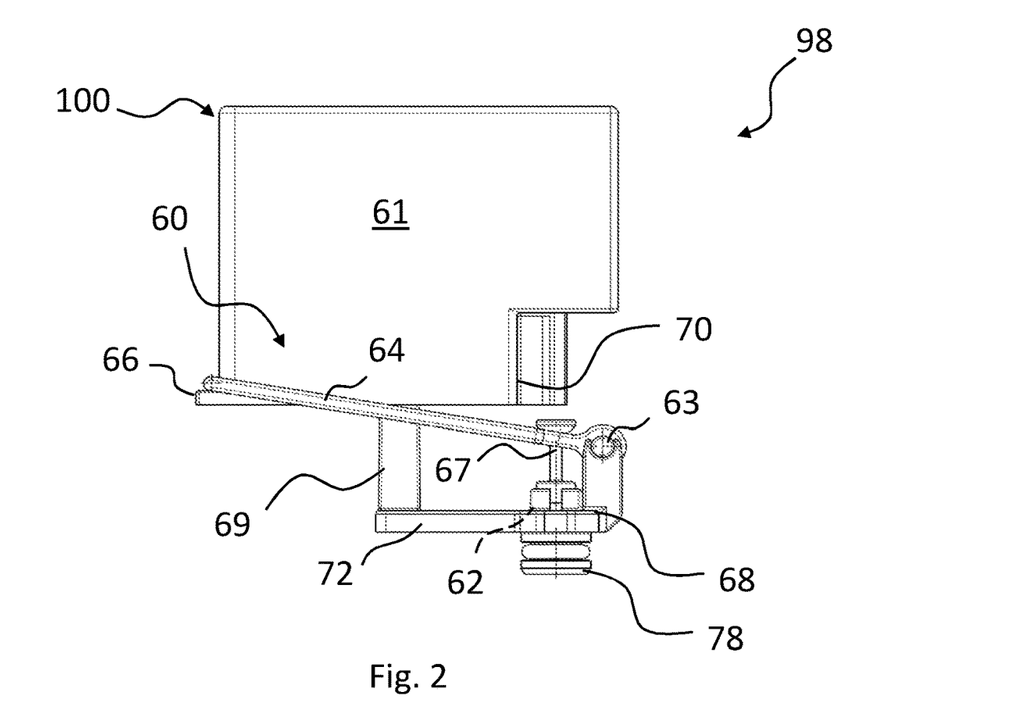
FIG. 2 shows in a side view a schematic illustration of the sensor unit of a discharge control device according to FIG. 1 with the closure body in the open position.
Figure 3:
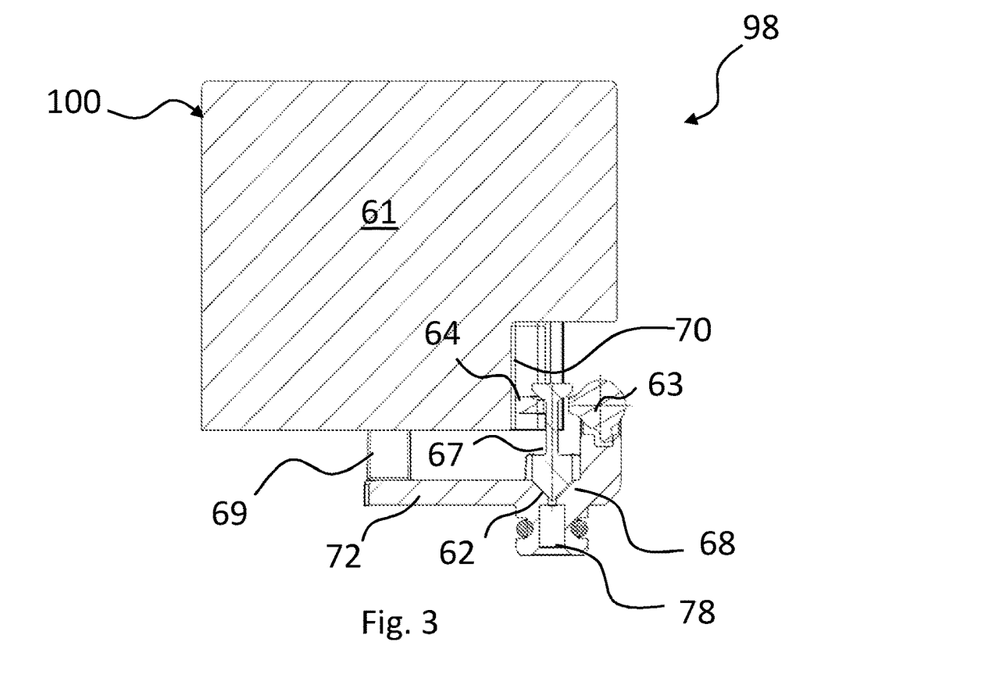
FIG. 3 shows a longitudinal section of the sensor unit in the closed position of the closure body according to FIG. 1.
Figure 4:
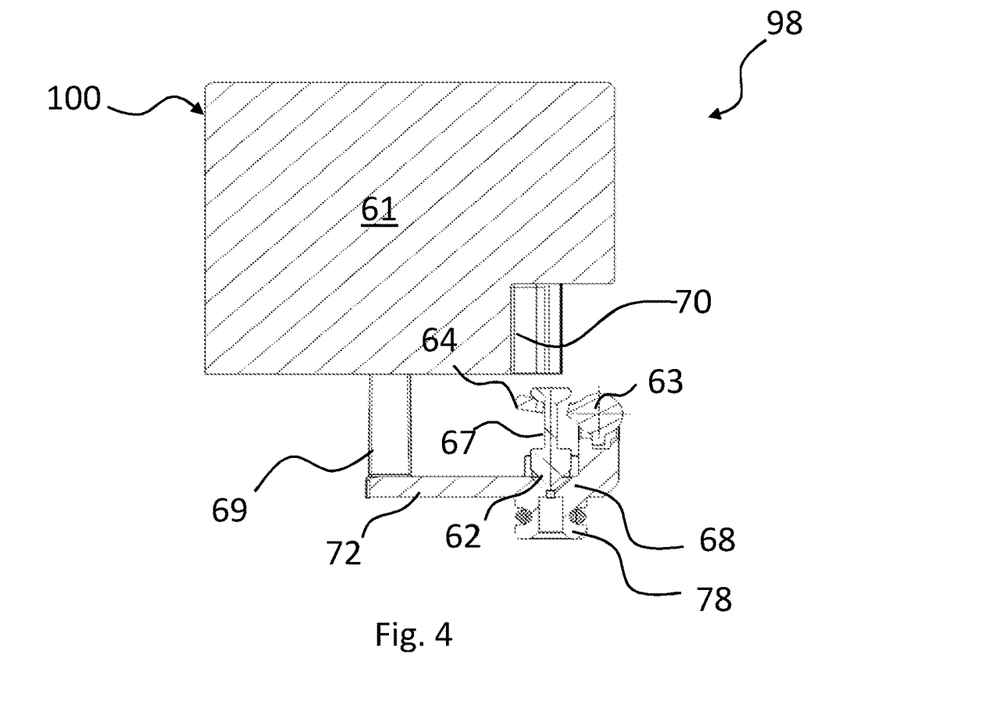
FIG. 4 shows a longitudinal section of the sensor unit in the open position of the closure body according to FIG. 2.
Figure 5:
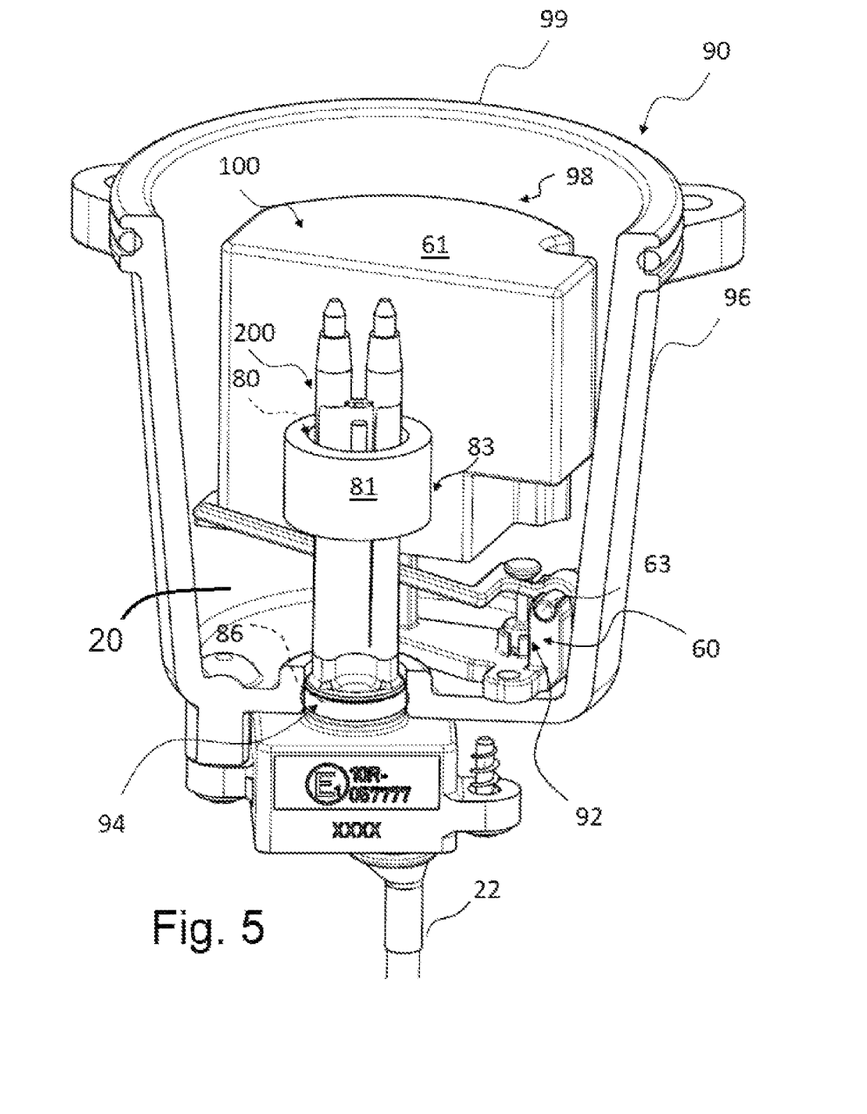
FIG. 5 shows a partially sectioned isometric view of a module with collecting chamber and sensor arrangement with a sensor unit according to FIG. 1 with the closure body in the closed position.
Figure 6:
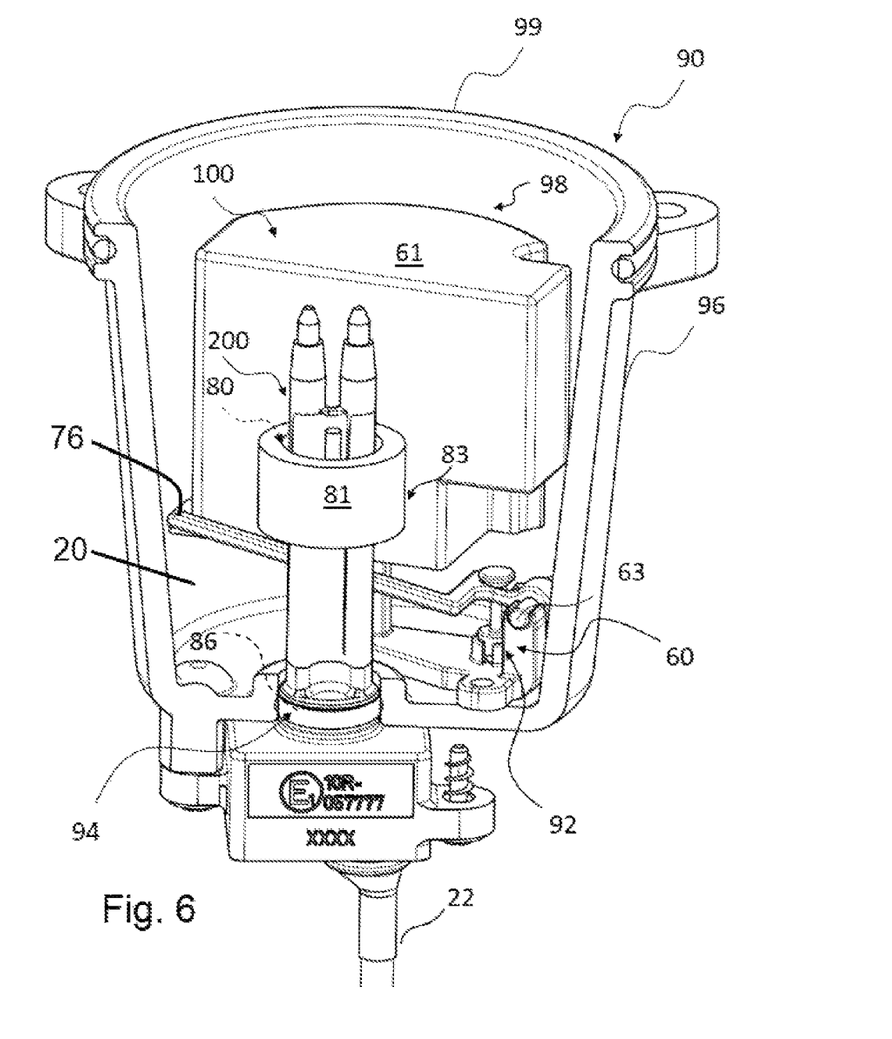
FIG. 6 shows a partially sectioned isometric view of a module with collecting chamber and sensor arrangement with a sensor unit according to FIG. 1 with the closure body in the open position.
Figure 7:
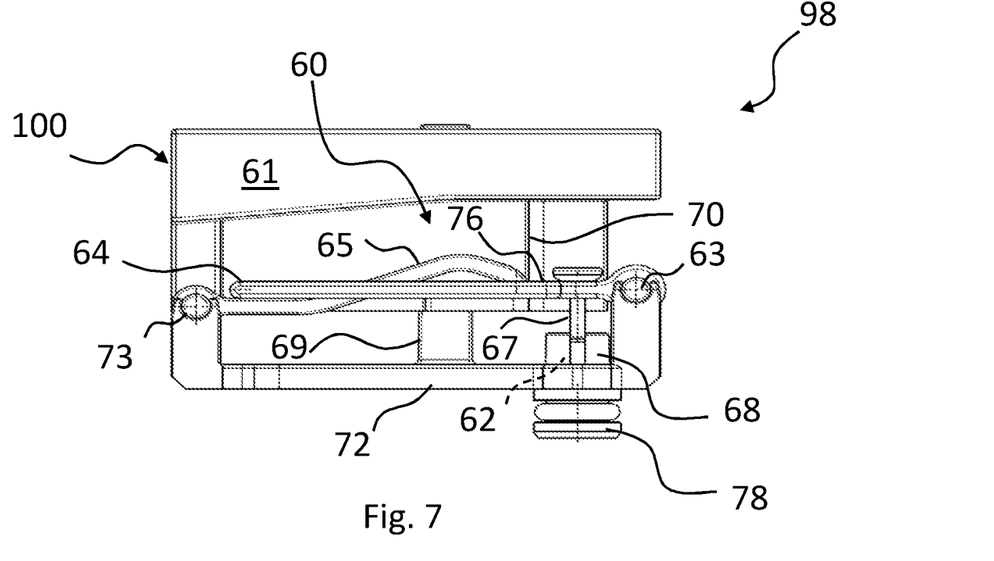
FIG. 7 shows in a side view a schematic illustration of a sensor unit of a discharge control device according to a further embodiment of the invention with a closure body in the closed position.

FIGS. 1 to 4 show respectively in schematic illustration a side view and a longitudinal section of a sensor unit 100 of a discharge control device according to a first embodiment of the invention with a closure body 62 in the closed position (FIGS. 1, 3) and in the open position (FIGS. 2 and 4). FIGS. 5 and 6 show an isometric illustration of a partially sectioned module 90. The module 90 comprises a collecting chamber 20 in a housing 96 with a sensor arrangement 300 (i.e. sensor units 100 plus 200, see FIG. 13), wherein the sensor arrangement 300 comprises the sensor unit 100 as well as a further sensor unit 200. The module 90 can be connected by a flange 99 to a filter housing (not illustrated).

The first sensor unit 100 is configured as a float 61. The float 61 is configured to be arranged in the collecting chamber 20 in which a medium is collected that is to be drained from time to time by a shut-off valve 92 from the collecting chamber 20. The medium is, for example, water that is separated upon filtration from the diesel fuel and collected in the collecting chamber 20. In this context, diesel as well as water can be present in the collecting chamber 20.

The more diesel is filtered, the more water collects in the collecting chamber 20. Diesel is located above the water level which, with continued operation, rises correspondingly. The float 61 is preferably configured such that it has a density that is higher than that of the diesel (first medium) and less than that of water (second medium). When water and diesel are contained in the collecting chamber, the float 61 sinks in the diesel and floats in the water.

The float 61 is not only sensitive to the presence of water in the collecting chamber 20 but functions at the same time also as an actor which can move a closure body 62 of a shut-off valve 92, depending on the position of the float 61, into a first position, for example, a closed position, and into a second position, for example, an open position. This is done purely mechanically in that the float 61 is coupled by a lever device 60 with the closure body 62. The lever device 64 for actuating the closure body 62 is configured as a single-lever arrangement.

The housing 96 accommodates the collecting chamber 20. The housing 96 can be the housing of the module 90 or optionally a component of a filter housing (not illustrated).

A shaft 63 is arranged fixedly relative to the housing 96 in the collecting chamber 20. A lever rod 64 is supported with one end pivotably at the shaft 63 and with its other end supported at the float 61 at a bearing location 76. When the float 61 moves in vertical direction, the end of the lever rod 64 disposed at the float is moved correspondingly while, in contrast thereto, the end of the lever rod 64 disposed at the shaft will not change its vertical position.

Advantageously, the float 61, the lever arrangement 60, and the mechanically actuatable shut-off valve 92 are embodied as a separate assembly 98 which is mountable in the collecting chamber 20. The closure body 62 of the shut-off valve 92 is seated in the closed position in a sealing seat 68 in a base element 72 of the assembly and closes in this position an opening through which the medium contained in the collecting chamber 20 can exit. In the closed position, there is no or only little water in the collecting chamber 20. The base element 72 comprises on the side which is oppositely positioned to the closure body 62 a sealing device 78 with which the shut-off valve 92 can engage a connecting line to a further shut-off valve 94 (FIGS. 5, 6). Advantageously, a shaft 63 of the lever arrangement 60 can be supported at the base element 72.

The closure body 62 is arranged by means of a connecting element 67 at the lever rod 64, namely between shaft 63 and the end of the lever rod 64 disposed at the float. The float 61 comprises a cutout 70 into which the shaft 63 with its bearing and the connecting element 67 can plunge in the closed state, which is beneficial for the size of the arrangement.

When the water level in the collecting chamber 20 rises, the float 61 rises upwardly and pulls the connecting element 67 upwardly. In this way, the closure body 62 is lifted out of the sealing seat 68 and the opening is released.

So that the float 61 does not tilt, a guide 69 is arranged that is fixed relative to the housing 96 and along which the float 61 can glide up and down in vertical direction depending on the water level. The guide 69 engages an opening in the float 61 which is not identified here.

In the partially sectioned isometric view of the module 90 with collecting chamber 20 in the FIGS. 5 and 6, a further sensor unit 200 with a further shut-off valve 94 is arranged in the collecting chamber 20 in addition to the first sensor unit 100 with the mechanically actuatable shut-off valve 92.

The sensor unit 200 comprises preferably a magnetic field sensor 80 which is correlated with a reed switch 83 with a magnetic float 81. The shut-off valve 94 comprises a closure body 86, which is not visible and is electromagnetically actuatable as soon the magnetic field sensor 80 of the reed switch 83 detects a sufficiently high water level.

The two shut-off valves 92 and 94 are coupled with each other so that a medium outlet 22 of the collecting chamber can be opened only when both shut-off valves 92, 94 are open. Preferably, both shut-off valves 92, 94 are connected in series in flow communication with each other wherein in particular the first mechanically actuated shut-off valve 92 is arranged upstream of the second, preferably electromagnetically actuated, shut-off valve 94.

In an alternative embodiment that is not illustrated in the drawing, the mechanically actuatable shut-off valve 92 can be arranged downstream of the second shut-off valve 94.

Figure 8:
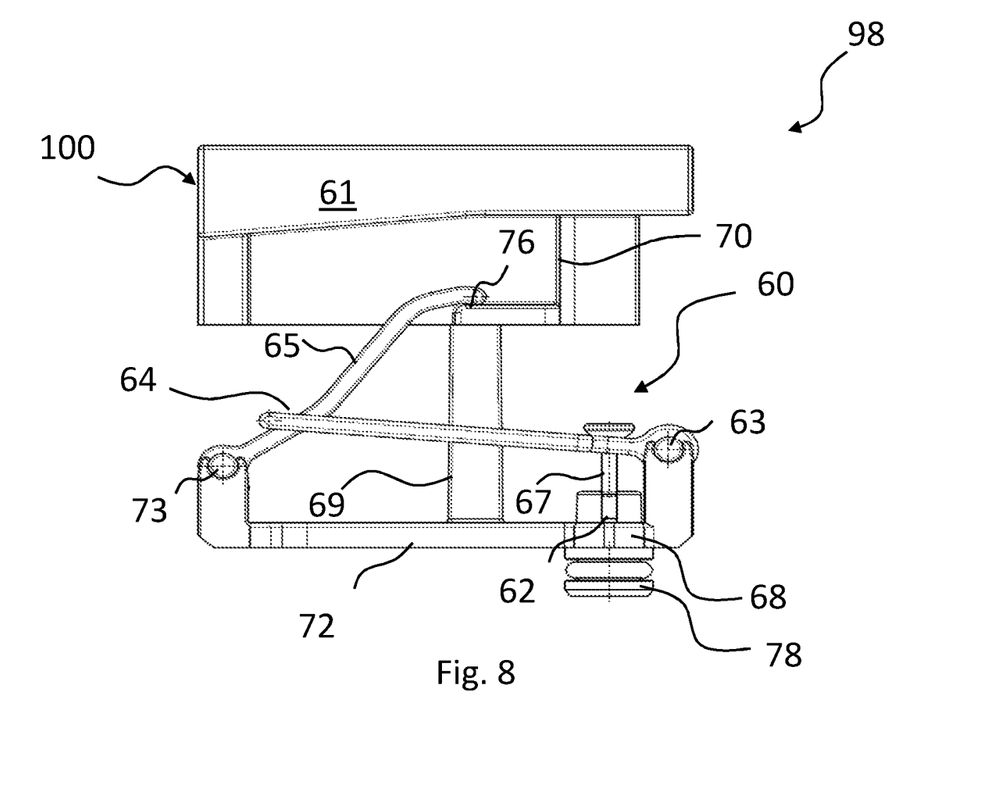
FIG. 8 shows in a side view a schematic illustration of the sensor unit of a discharge control device according to FIG. 1 with the closure body in the open position.
Figure 9:
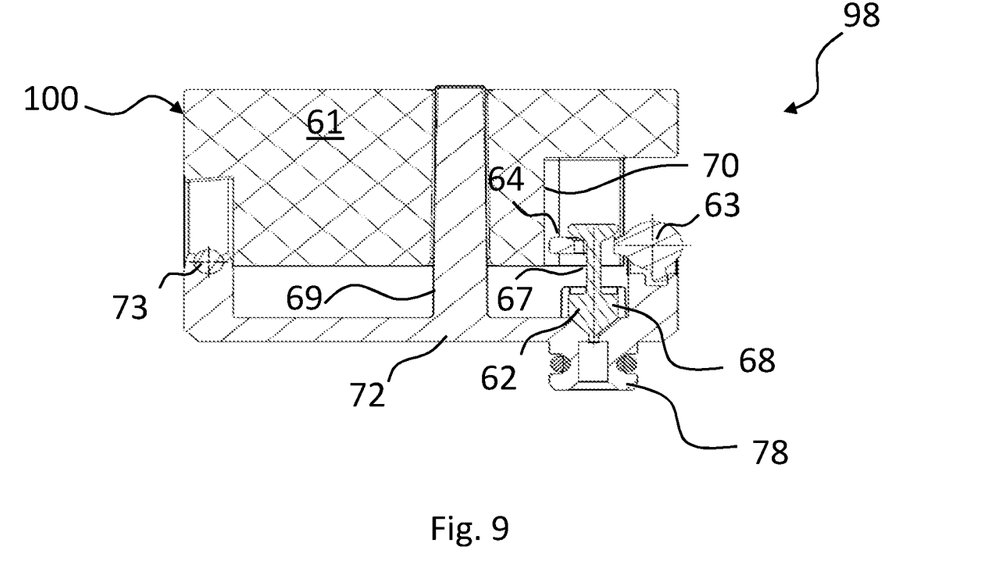
FIG. 9 shows a longitudinal section of the sensor unit in the closed position of the closure body according to FIG. 7.
Figure 10:
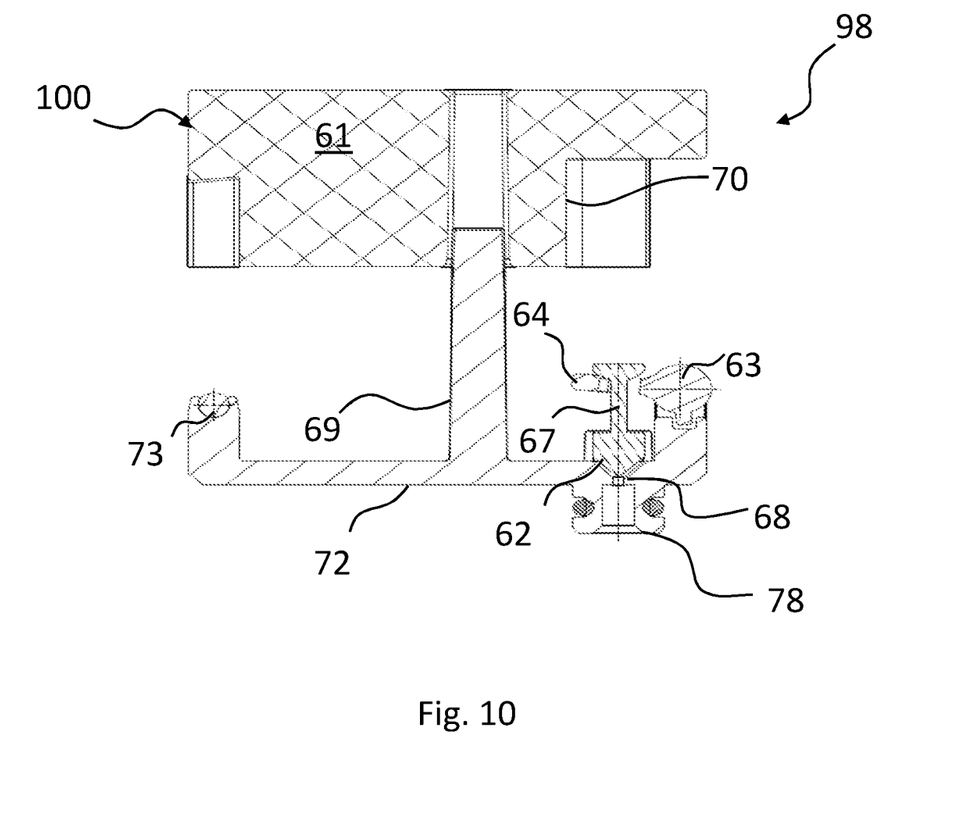
FIG. 10 shows a longitudinal section of the sensor unit in the open position of the closure body according to FIG. 8.
Figure 11:
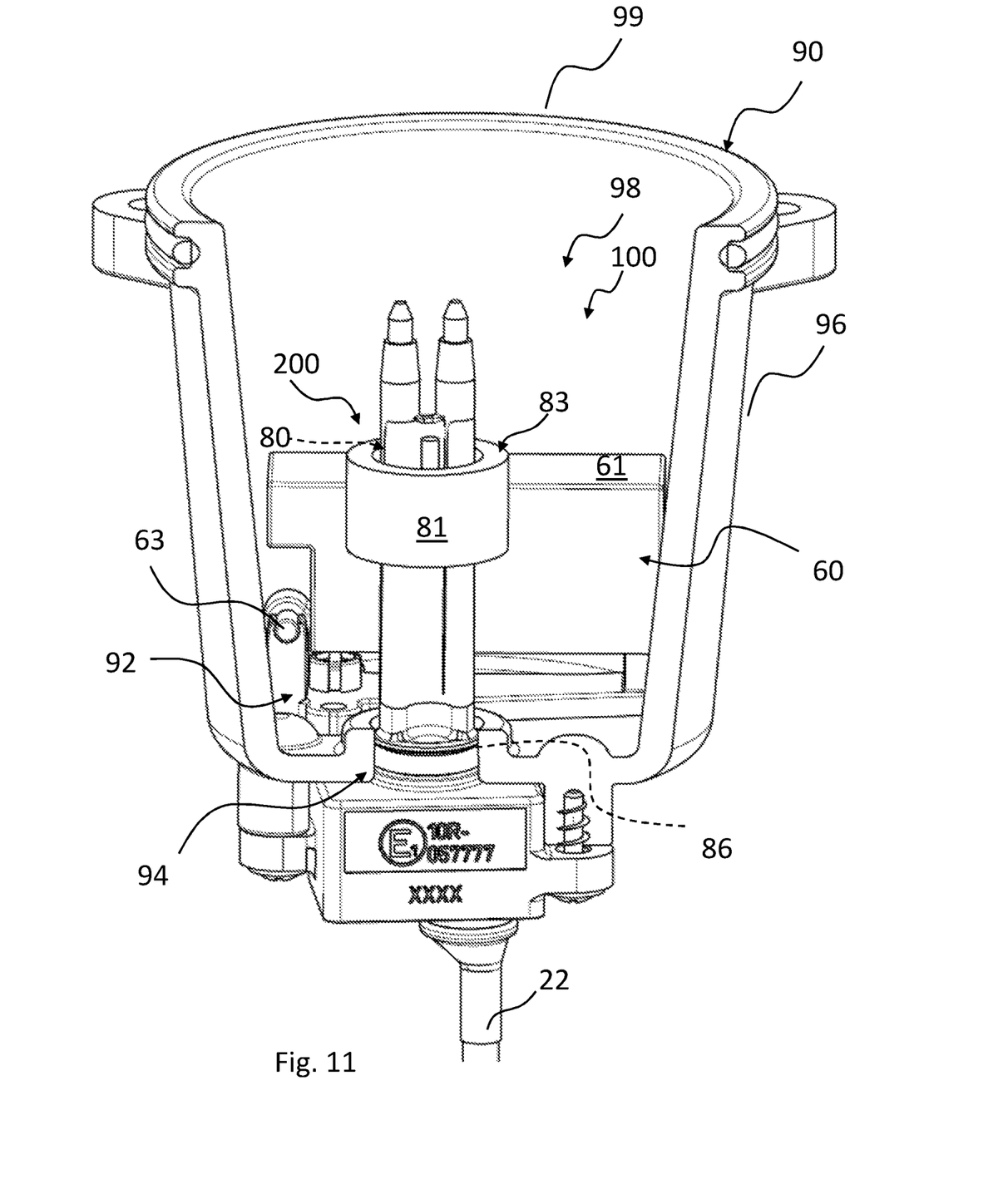
FIG. 11 shows a partially sectioned isometric view of a module with collecting chamber and sensor arrangement with a sensor unit according to FIG. 7 with the closure body in the closed position.
Figure 12:
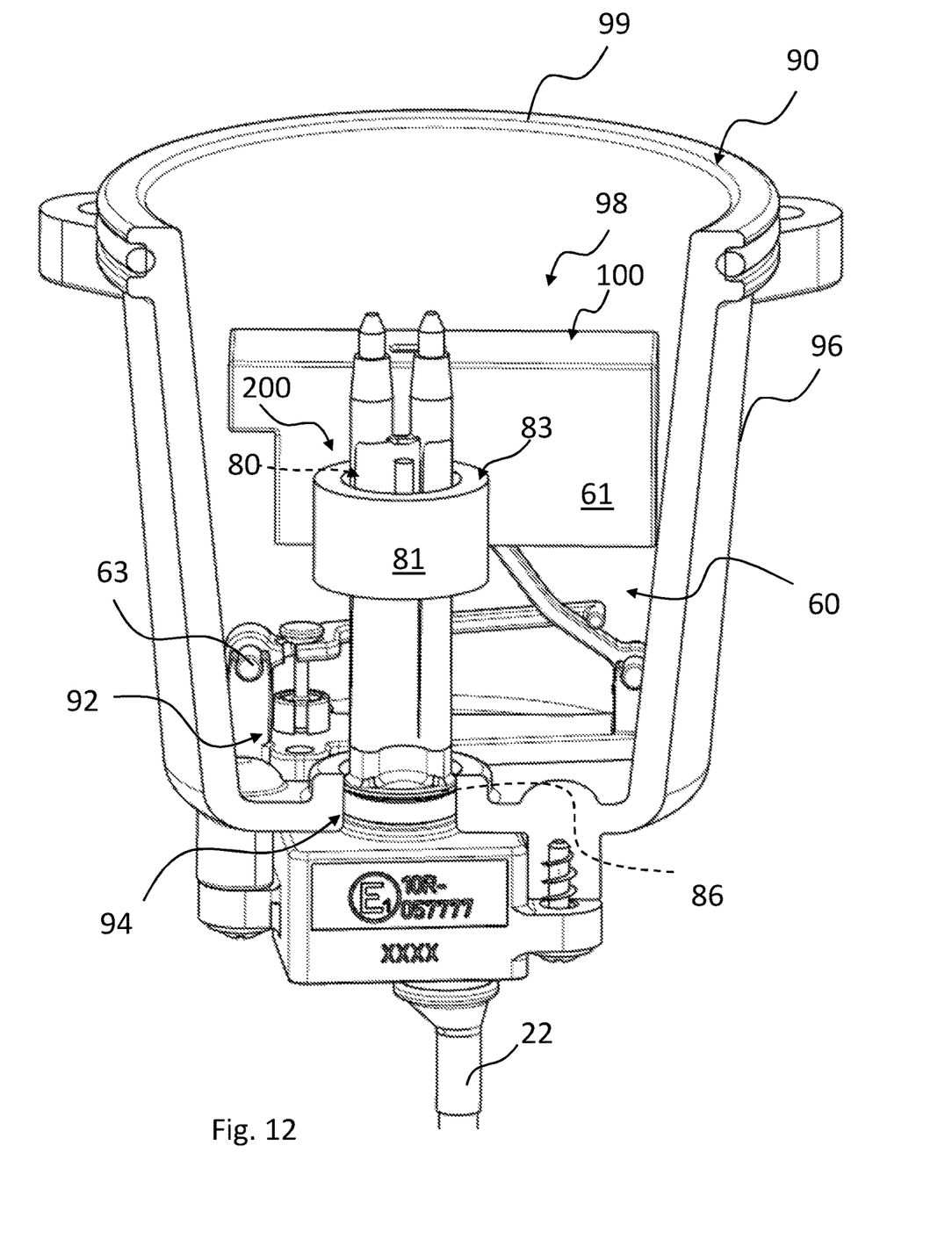
FIG. 12 shows a partially sectioned isometric view of a module with collecting chamber and sensor arrangement with a sensor unit according to FIG. 7 with the closure body in the open position.

FIGS. 7 to 10 show respectively in schematic illustration a side view and a longitudinal section of a sensor unit 100 of a discharge control device according to a further embodiment of the invention with a closure body 62 in the closed position (FIGS. 7, 9) and in the open position (FIGS. 8 and 10). FIGS. 11 and 12 show an isometric illustration of a partially sectioned module 90. The module 90 comprises a collecting chamber 20 in a housing 96 with a sensor arrangement 300 wherein the sensor arrangement 300 comprises the sensor unit 100 as well as a further sensor unit 200. The module 90 can be connected by a flange 99 to a filter housing (not illustrated).

The sensor unit 100 is configured as a float 61. The float 61 is configured to be arranged in the collecting chamber 20 in which a medium is collected that from time to time is to be drained through a shut-off valve 92 from the collecting chamber 20. The medium is, for example, water that is separated upon filtration from the diesel fuel and is collected in the collecting chamber 20. In the collecting chamber 20, diesel as well as water may be present.

The more diesel is filtered, the more water is collected in the collecting chamber 20. Diesel is located above the water level which rises with continued operation. The float 61 is preferably configured such that it has a density that is higher than that of diesel (first medium) and less than that of water (second medium). When water and diesel are present in the collecting chamber, the float 61 sinks in the diesel and floats in the water.

The float 61 is not only sensitive to the presence of water in the collecting chamber 20 but functions at the same time as an actor which can move a closure body 62 of a shut-off valve 92, depending on the position of the float 61, into a first position, for example, a closed position, and into a second position, for example, an open position. This is realized purely mechanically in that the float 61 is coupled by a lever device 60 with the closure body 62. The lever device 60 for actuating the closure body 62 is embodied as a multi-lever arrangement.

The housing 96 accommodates the collecting chamber 20. The housing 96 can be the housing of the module 90 or optionally a component of the filter housing (not illustrated).

A shaft 63 is fixedly arranged relative to the housing 96 in the collecting chamber 20. A lever rod 64 is supported with one end pivotably at the shaft 63 and with its other end supported at a further lever rod 65. The shaft 63 of the first lever rod 64 of the lever arrangement 60 is supported at the base element 72. The second lever rod 65 is supported with one end at a shaft 73 at the base element 72. The second lever rod 65 is supported with its oppositely positioned end at the float 61 at a bearing location 76. The first lever rod 64 is of a straight configuration while the second lever rod 65 is expediently provided with an S-shaped course. The first lever rod 64 in the closed state of the closure body 62 is resting on the second lever rod 65 near the shaft 73. When the float 61 moves in vertical direction, the end of the lever rod 64 disposed at the float moves correspondingly. The end of the first lever rod 64 which is resting on the second lever rod 65 glides along the second lever rod 65 which rises due to the vertical movement of the float 61. In contrast thereto, the end of the first lever rod 64 disposed at the shaft does not change its vertical position.

Advantageously, the float 61, the lever arrangement 60, and the mechanically actuatable shut-off valve 92 are configured as a separate assembly 98 which is mountable in the collecting chamber 20. The closure body 62 of the shut-off valve 92 in the closed position is seated in a sealing seat 68 in a base element 72 of the assembly and closes in this position an opening through which the medium present in the collecting chamber 20 can exit. In the closed position, there is no or little water in the collecting chamber 20. The base element 72 comprises, at the side oppositely positioned to the closure body 62, a sealing device 78 with which the shut-off valve 92 can engage a connecting line to a further shut-off valve 94 (FIGS. 11, 12).

The closure body 62 is arranged by a connecting element 67 at the first lever rod 64, namely between shaft 63 and the end of the lever rod 64 at the float. The float 61 comprises a cutout 70 into which the shaft 63 with its bearing and the connecting element 67 can plunge in the closed state, which is beneficial for the size of the arrangement.

When the water level in the collecting chamber 20 rises, the float 61 rises upwardly and pulls the connecting element 67 upwardly. In this way, the closure body 62 is lifted out of the sealing seat 68 and the opening is released.

So that the float 61 does not tilt, a guide 69 is arranged that is fixed relative to the housing 96 and along which the float 62 can glide up and down in vertical direction depending on the water level. The guide 69 engages an opening in the float 61 which is not identified in detail.

In the partially sectioned isometric view of the module 90 in the FIGS. 11 and 12, a further sensor unit 200 with a further shut-off valve 94 is arranged in the collecting chamber 20 in addition to the first sensor unit 100 with the mechanically actuatable shut-off valve 92.

The sensor unit 200 comprises preferably a magnetic field sensor 80 which is correlated with a reed switch 83 with a magnetic float 81. The shut-off valve 94 comprises a closure body 86, which is not visible in detail and which is electromagnetically actuatable as soon as the magnetic field sensor 80 of the reed switch 83 detects a sufficiently high water level.

The two shutoff valves 92 and 94 are coupled with each other so that a media outlet 22 of the collecting chamber is opened only when both shut-off valves 92, 94 are open. Preferably, both shut-off valves 92, 94 are connected in series in flow communication with each other wherein particularly preferred the first mechanically actuatable shut-off valve 92 is arranged upstream of the second, preferably electromagnetically actuatable, shut-off valve 94.

In an alternative embodiment, not illustrated in the drawing, the mechanically actuatable shut-off valve 92 can be arranged downstream of the second shut-off valve 94.

Figure 13:
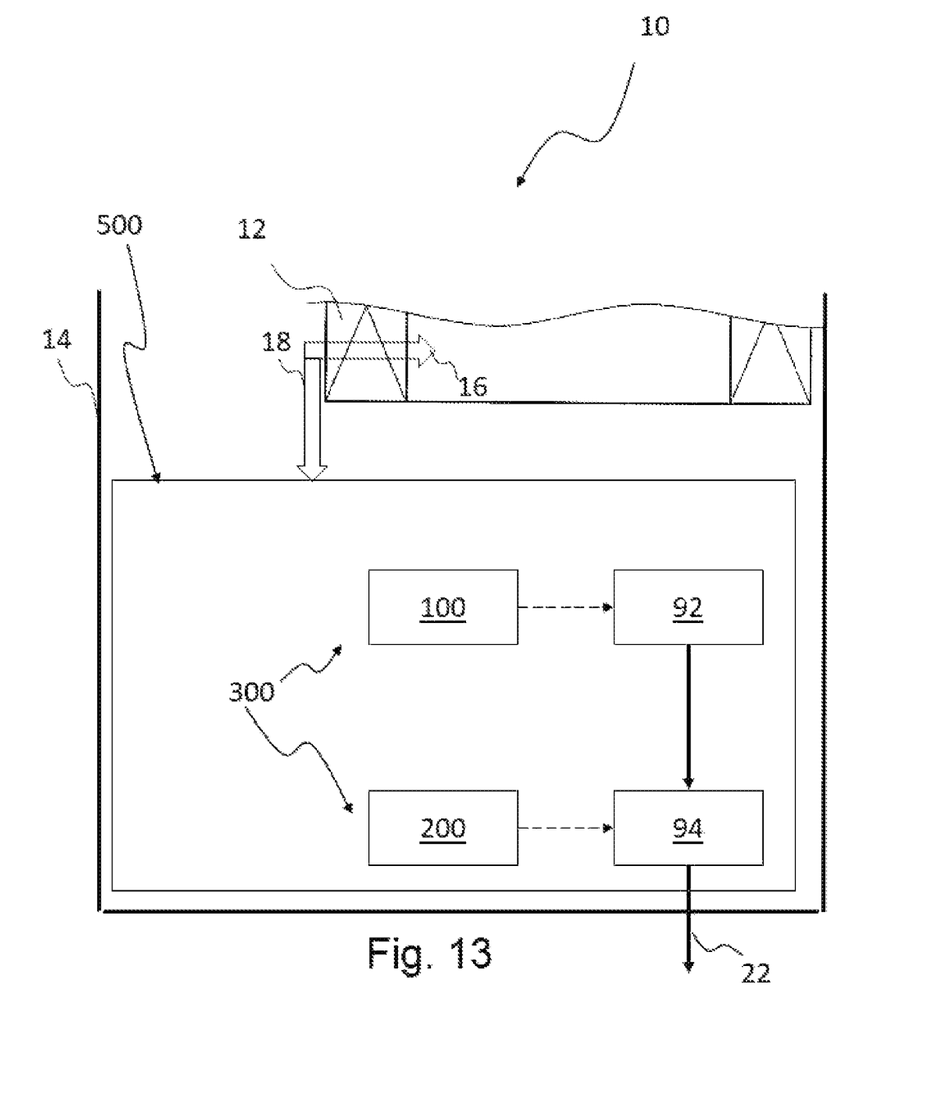
FIG. 13 shows in schematic illustration a block diagram with filter element and collecting chamber according to an embodiment of the invention.

FIG. 13 shows largely schematically a filter system 10 for filtering a media flow comprising a first and a second medium 16, 18, with a filter element 12 that is arranged in a housing 14 and in particular exchangeable and with a discharge control device 500, as has been described above in FIGS. 5, 6 and 11, 12 in an exemplary fashion. The first medium 16 is diesel, for example; the second medium 18 is water, for example. The second medium 18 is separated at the filter element 12 from the first medium 16 and collected in a collecting chamber 20.

In the collecting chamber 20, a sensor arrangement 300 with a first sensor unit 100 and a second sensor unit 200 is arranged. The first sensor unit 100 comprises a float which is coupled with a first shut-off valve 92 that is thus actuated purely mechanically. The second sensor unit 200 is coupled with a second, in particular electrically actuatable, shut-off valve 94. Configurations of the first sensor unit 100 have been described in an exemplary fashion in FIGS. 1 through 12.

Only when both shut-off valves 92, 94 are open, the second medium 18 collected in the collecting chamber 20 can be drained through a media outlet 22 from the collecting chamber 20. The purely mechanically actuatable shut-off valve 92 prevents an accidental drainage of medium from the collecting chamber 20 when the second shut-off valve 94 is open due to a fault state even though no or only little second medium 18 is present in the collecting chamber 20 and the first medium could exit accidentally. In particular, due to the first purely mechanically actuated shut-off valve 92, it can be ensured that the collecting chamber is properly closed after a drainage process even in case of a faulty function of the second shut-off valve (caught in open position).

What is claimed is:

1. A discharge control device for a filter system for filtering a media flow comprising a mixture of
 a first medium and
 a second medium,
 the discharge control device comprising:
 a housing having a collecting chamber configured to collect the second medium separated from the media flow;
 a sensor arrangement comprising a first sensor unit, a second sensor unit,
 a first shut-off valve comprising a first closure body, and
 a second shut-off valve;
 wherein the first sensor unit is operatively connected to the first shut-off valve,
 wherein the first sensor unit comprises a float configured to purely mechanically actuate the closure body of the first shut-off valve;
 wherein the second shut-off valve is arranged in series in flow communication with the first shut-off valve, the second shut-off valve comprising
 an electromagnetically actuatable valve configured to be controlled by the second sensor unit as a function of a fill level of the second medium in the collecting chamber;
 a lever device connected to the first shutoff valve and configured to actuate the closure body of the first shutoff valve, the lever device comprising:
 a second lever rod pivotally mounted at a first end to a second shaft connected to the housing, an opposite second end of the second lever rod received into a cutout in the float, the second end of the second lever rod sliding within a slot as the float changes in vertical position; and
 a first lever rod pivotally mounted at a first end to a first shaft connected to the housing, a second end of the first lever rod gliding along an outer side of the second lever rod, a position of the first lever rod on the second lever rod changing as the float changes in vertical position;

a connecting element connected to the closure body of the first shut-off valve is arranged at the first lever rod and support at a position between the first shaft and the float.

2. The discharge control device according to claim 1, wherein
the second shut-off valve is arranged downstream of the first shut-off valve.

3. The discharge control device according to claim 1, wherein
the float of the first sensor unit has a density that is higher than a density of the first medium and less than a density of the second medium.

4. The discharge control device according to claim 1, wherein
the float of the first sensor unit, the lever device, and the first shut-off valve are configured as a separate assembly configured to be mounted in the collecting chamber as a single unit.

5. The discharge control device according to claim 1, wherein
each one of the first and second sensor units has correlated therewith a separate one of the first and second shut-off valves.

6. The discharge control device according to claim 1, wherein
the second sensor unit is configured to directly control the second shut-off valve.

7. The discharge control device according to claim 1, wherein
the second sensor unit comprises a magnetic field sensor configured to detect a magnetic field which penetrates the first medium and the second medium contained in the collecting chamber.

8. The discharge control device according to claim 7, wherein the magnetic field sensor is a reed switch.

9. The discharge control device according to claim 8, wherein
the second sensor unit comprises a magnetic float that rises upon presence of the second medium in the collecting chamber and that interacts with the reed switch.

10. The discharge control device according to claim 8, wherein
the second sensor unit projects into the collecting chamber and configured to directly control the second shut-off valve, the second sensor unit having:
a magnetic field sensor arranged in the second sensor unit and in the collecting chamber, and configured to electrically actuate the second shut-off valve;
a magnetic float having a permanent magnetic field, the magnetic float configured to rise relative to the magnetic field sensor, rising upon detection of the rising fill level of the second medium in the collecting chamber;
wherein the magnetic field sensor detects the rising fill level of the second medium by detecting the permanent magnetic field of the rising magnetic float.

11. The discharge control device according to claim 10, wherein
the second sensor unit further comprises
one or more sensors selected from the group consisting of a capacitive sensor, an optical sensor, and a resistance sensor.

12. A filter system for filtering a media flow comprising a first medium and a second medium, the filter system comprising:
the housing and a filter element arranged in the housing;
a discharge control device according to claim 1 disposed at the housing.

13. The filter system according to claim 12 configured as a fuel filter system, wherein the discharge control device is configured to discharging water separated from the fuel from the collecting chamber of the discharge control device.

14. The filter system according to claim 12, wherein the filter element is an exchangeable filter element.

15. The discharge control device according to claim 1, wherein
the electromagnetically actuatable valve has a second closure body, the second closure body received into the collecting chamber though an opening in a bottom of the housing;
wherein the second shutofff valve further includes the second sensor unit, the second sensor unit of the second shutoff valve projecting into the collecting chamber, the second sensor unit having:
a magnetic field sensor arranged in the second sensor unit and in the collecting chamber, and configured to electrically actuate the second shut-off valve;
a magnetic float having a permanent magnetic field, the magnetic float configured to rise relative to the magnetic field sensor, rising upon detection of the rising fill level of the second medium in the collecting chamber;
wherein the magnetic field sensor detects the rising fill level of the second medium by detecting the permanent magnetic field of the rising magnetic float.

* * * * *